No. 673,855. Patented May 7, 1901.
H. J. FREARK.
DRAFT EQUALIZER.
(Application filed June 27, 1900. Renewed Feb. 9, 1901.)
(No Model.)
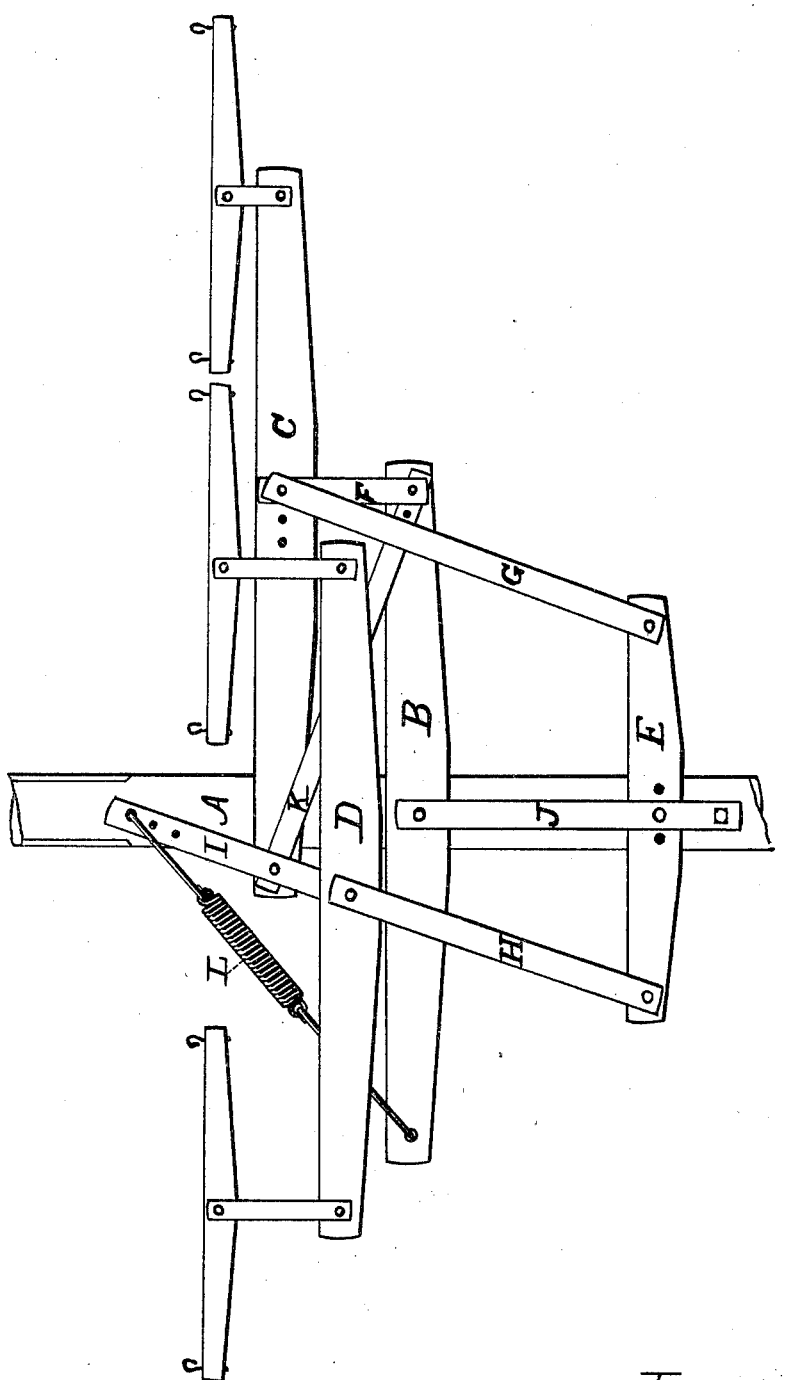
Witnesses
Inventor
Henry J Freark
By
Attorney

UNITED STATES PATENT OFFICE.

HENRY J. FREARK, OF SPRINGFIELD, ILLINOIS, ASSIGNOR OF ONE-HALF TO F. A. FREEARK, OF SAME PLACE.

DRAFT-EQUALIZER.

SPECIFICATION forming part of Letters Patent No. 673,855, dated May 7, 1901.

Application filed June 27, 1900. Renewed February 9, 1901. Serial No. 46,721. (No model.)

*To all whom it may concern:*

Be it known that I, HENRY J. FREARK, a citizen of the United States, residing at Springfield, in the county of Sangamon and State of Illinois, have invented certain new and useful Improvements in Draft-Equalizers, of which the following, together with the accompanying drawing, is a complete specification.

My invention relates generally to draft-equalizers for three animals as applied to any vehicle or machine drawn by a draft-pole, but particularly to equalizers for three animals as applied to farm and freight wagons, and has for its objects, in addition to equalizing the burden, the obviation of lateral draft and also of contact on the part of the levers with the front wheels of the vehicle, all existing contrivances being open to objection on both these accounts. I attain these ends by a mechanism which consists in the combination, with the draft-pole, of three doubletrees, a bar pivoted to the draft-pole backward of the doubletrees, a coil-spring, and a system of connecting-pieces joining the ends of said bar with the doubletrees, as will be more fully specified hereinafter.

Referring to the drawing, A represents an ordinary draft-pole; B, an ordinary doubletree; C, a second doubletree extending B and coöperating with it; D, a third doubletree; E, the rear bar; G, I, K, and F, the connecting-pieces uniting, respectively, one end of the rear bar with the middle of C, the other end with the middle of D and the inner end of C, this end of C with one end of B, and this end of B in turn with the middle of C. The spring L connects the other end of B with the inner end of C through the medium of I. H, which forms the upper part of I, and J are hammer-straps.

The doubletree B is pivoted to the draft-pole in the same place and in the same manner as when but two animals are used. To one end of this is attached, by means of the link F, the second doubletree C, with a singletree at its outer end, and in such manner that its other end rests on the draft-pole or hounds, where through the medium of I and K it is held in position by the third doubletree D, which rests just above and upon it. The bar E is pivoted centrally or otherwise to the draft-pole some twenty inches, more or less, back of the doubletree B. Pivotally connecting one end of the bar E with the middle of the doubletree C is the link G, while link I connects the other end of the bar E with the middle of the doubletree D and the inner end of C, the link K this end of C with one end of B, and the link F this end of B with the middle of C. The spring L through the medium of rods or chains pivotally unites the other end of B with the forward end of I.

It will be observed that C and E are provided with a series of holes, so that they can be adjusted according as more or less efficient power is desired from the animal hitched to C or those hitched to D, also that C is several inches in front of B, thus securing several inches more of backward play without interfering with the front wheels of the vehicle, and also that it is reversible—*i. e.*, that it can by making the necessary changes be attached to the other end of B, so as to accommodate the vehicle to an animal that may work better on one side than on the other or to accommodate the animals to a given vehicle, piece of machinery, or condition of the highways. It will be observed also that the function of K, which is also provided with a series of holes for adjustment, is to hold C and D in a position over A, so as to prevent side draft. The part, however, of which the primary and only function is to obviate side draft is the spring L and its connecting-links. It will be observed that when a forward pull is exerted upon D a lateral poleward pull will be communicated to the free end of B, thus exerting a lateral push against the pole at the point at which the push is exerted in the opposite direction by the mechanism to which the odd animal is hitched, the intensity of the push being determined by the strength of the spring, and that when a forward pull is exerted on C the spring will relax. It will be observed, moreover, that I rests above and upon B, thus causing the weight D to come upon the free end of B, with the effect of holding the latter, with its extension C, in a horizontal position.

From the foregoing description and the laws of levers it will appear that whenever by reason of the application of a greater amount of power to the doubletree D or the doubletree C the one or the other is moved forward the movement is at once communicated to the other in like intensity in the opposite direction and without interfering with the wheels of the vehicle, the balance of power, both forward and lateral, being regulated by adjusting the doubletree C, the bar E, the link K, and the spring and links L.

It is obvious that slight variations in construction—such as connecting L directly with C, substituting a chain for L, bending or extending E, so as to avoid hound-braces or "fifth-wheel," &c.—may be resorted to without materially departing from the scope of the invention or sacrificing its advantages.

Having thus described my invention, I claim—

The combination of a draft-pole, a bar E and a doubletree B pivoted thereto, and adjustable extension doubletree C, and a doubletree D, coöperating therewith, a link G pivotally connecting one end of the bar E with the middle of the doubletree C, a link I pivotally connecting the other end of the bar E with the middle point of the doubletree D and the inner end of the doubletree C, a link K pivotally connecting the inner end of the doubletree C with one end of the doubletree B, a link F pivotally uniting this end of the doubletree B with the middle of the doubletree C, and a spring and links L pivotally joining the forward end of I with the other or free end of the doubletree B, all arranged and located as set forth.

In testimony whereof I affix my signature in the presence of two witnesses.

HENRY J. FREARK.

Witnesses:
A. H. SMITH,
J. F. BUNN.